United States Patent [19]

Evans

[11] 4,329,528

[45] May 11, 1982

[54] METHOD OF DEFOAMING CRUDE HYDROCARBON STOCKS WITH FLUOROSILICONE COMPOUNDS

[75] Inventor: Edwin R. Evans, Clifton Park, N.Y.

[73] Assignee: General Electric Company, Waterford, N.Y.

[21] Appl. No.: 211,961

[22] Filed: Dec. 1, 1980

[51] Int. Cl.³ .................... C07C 7/20; C10L 1/28; B01D 19/04; B01B 1/04
[52] U.S. Cl. ........................... 585/3; 585/10; 208/348; 208/370; 203/20; 201/9; 252/49.6
[58] Field of Search ............. 208/348, 370; 585/3, 585/10, 7; 252/49.6; 203/20

[56] References Cited

U.S. PATENT DOCUMENTS

| | | | |
|---|---|---|---|
| 3,264,365 | 8/1966 | Luken | 203/20 |
| 3,384,600 | 5/1968 | Domba | 252/49.6 |
| 3,409,510 | 11/1968 | Le Master et al. | 203/20 |
| 3,464,916 | 9/1969 | Privette | 208/348 |
| 3,467,581 | 9/1969 | Privette et al. | 203/20 |
| 3,642,626 | 2/1972 | Christian | 252/49.6 |
| 3,700,587 | 10/1972 | Hyde | 203/20 |
| 4,115,343 | 9/1978 | Guillaume et al. | 252/49.6 |

*Primary Examiner*—Delbert E. Gantz
*Assistant Examiner*—Olik Chaudhuri
*Attorney, Agent, or Firm*—E. Philip Koltos

[57] ABSTRACT

A method of defoaming crude hydrocarbon stocks comprising adding to the hydrocarbon stock at least 1 part per million of a fluorosilicone copolymer having from 20 to 70 mole percent of fluorosilicone siloxy units.

22 Claims, No Drawings

METHOD OF DEFOAMING CRUDE HYDROCARBON STOCKS WITH FLUOROSILICONE COMPOUNDS

BACKGROUND OF THE INVENTION

The present invention relates to fluorosilicone compositions and more particularly the present invention relates to the use of fluorosilicone composition in defoaming crude hydrocarbon stocks.

Diorganopolysiloxane fluids are well known. Generally such fluids comprise a diorganosiloxane polymer with a viscosity varying from 10 to 1,000,000 centipoise where the polymer is triorganosiloxy end-stopped or silanol end-stopped. More preferably the polymer is triorganosiloxy end-stopped. The organo group in such a polymer may be selected from alkyl radicals, mononuclear aryl radicals, cycloalkyl radicals, alkenyl radicals and fluoroalkyl radicals such as 3,3,3-trifluoropropyl. Equally well known is the use of dimethyl polysiloxane polymers having viscosity in the range of anywhere from 10 to 500,000 centipoise as defoamers for various systems. Accordingly, such dimethylpolysiloxane polymers are well known defoamers for gas, oil separators; for glycol dehydrators; delayed cokers; Udex units where foam formulations are usually encountered in the stripper and extractor in units using diethylene and dipropylene glycol as extractor solvent thus reducing the capacity of the unit. Other units or processes in which defoamers are applied are vacuum tower units; propane deasphalting; and unit start-up in a refinery where units pumps may lose suction during the heating period due to foam caused by condensed water in the unit; amine scrubbing units; a furnace tube antifoulant and high detergent motor oils and asphalt processing and hot residuum storage in which the foaming limits the capacity of the tank and it may cause it to froth over outside the storage tanks.

These are just examples of various areas in which dimethylpolysiloxanes by themselves or with various other ingredients have been utilized to reduce the foaming in the apparatus or in the process. It should be noted that there are organic antifoamers. However, silicone antifoamers are preferred in that a very small amount has a substantial amount of defoaming activity. That is the silicone defoaming compounds are more efficient. Accordingly, dimethylpolysiloxane based antifoamers have been utilized in the above equipment and processes.

There are many types or variations of the dimethylpolysiloxane defoamers having a viscosity of anywhere from 10 to 500,000 centipoise. Thus, one type of composition is the emulsified dimethylpolysiloxane. Another type of defoaming composition has a filler such as a silica filler. Another type of defoamer composition that has advantages is one that has a small amount of a diorganopolysiloxane gum that is a gum having a viscosity of anywhere from 1,000,000 to 200,000,000 centipoise at 25° C. However, such dimethyl polysiloxanes have their limitations. Thus, the antifoamers are not very efficient in the defoaming of crude hydrocarbon stock such as crude oil. It was found that such compositions while the dimethylpolysiloxane fluid was soluble enough to accomplish the defoaming activity, nevertheless, didn't reduce the surface tension of the crude hydrocarbon stock sufficiently to cause it to result in efficient defoaming of the composition. There were some attempts in overcoming such deficiency by the production of new compositions. One attempt in overcoming such deficiency was to utilize a fluorosilicone homopolymer, that is a fluorosilicone homopolymer having 100 mole percent of methyl, 3,3,3-trifluoropropyl siloxy units. It was found when this compound was tried for defoaming purposes of crude hydrocarbon stocks that it was not sufficiently soluble and in fact even at elevated temperatures as high as 500° F. was insoluble in the crude hydrocarbon and accordingly could not accomplish its defoaming purpose in the composition that was to be defoamed. Accordingly, since dimethylpolysiloxanes were inefficient defoamers for crude hydrocarbon stocks and since other silicone polymers such as the 100 mole percent of methyl 3,3,3-trifluoropropyl homopolymer was not soluble in crude hydrocarbon stocks so as to accomplish the defoaming of the composition, it was desirable to find a silicone polymer that would carry out the necessary defoaming of the crude hydrocarbon stocks. The necessity or desirability of doing this results from several considerations.

Crude hydrocarbon stocks are usually saturated with dissolved gases such as methane, hydrogen sulfide, sulfur dioxide, carbon monoxide, carbon dioxide and lower molecular weight olefines such as ethylene, propylene and butadiene. The gases are maintained in the solution by the pressure exerted by confinement. When the oil is pumped above ground the gases tend to be released. A number of these gases as pointed out above are valuable which may serve as the nucleus of a petrochemical business. Degassing to recover these gases is usually carried out in such a manner that gases can be effectively separated from the oil and collected. A separate crude oil distillation column can be used for these purposes. To assist in the desolution of the gases the oil is usually heated to 300° to 500° F. The elevated temperatures serve to lower the solubility of the gases in a crude oil medium plus reducing the viscosity of the crude oil. The rapid evolution of the dissolved gases may cause excessive foaming due to the high surface tension of the medium. The existing foam is detrimental and is separated and by means of entrainment, the foam is carried out into the receivers. Foaming is partially offset by the use of less vigorous column conditions. Unfortunately a concomitant loss in both column through put and separation efficiency are observed.

Accordingly, it was highly desirable to utilize an effective and efficient defoaming agent in such distillation column in the separation of a low molecular weight olefin from the crude hydrocarbon stocks, such that when they were separated there was a minimum of foaming or no foaming at all.

Accordingly, it is one object of the present invention to provide a method for defoaming crude hydrocarbon stocks.

It is another object of the present invention to provide an efficient defoaming agent for crude oil.

It is still another object of the present invention to provide an efficient method for defoaming crude oil with a fluorosilicone polymer.

It is an additional object of the present invention to provide a highly efficient defoaming agent for hydrocarbon stocks which defoaming agent is effective at high temperatures and is superior to prior defoaming agents. These and other objects of the present invention are accomplished by means of the invention as set forth herein below.

SUMMARY OF THE INVENTION

In accordance with the above objects there is provided by the present invention a method for defoaming crude hydrocarbon stock, comprising addition to the crude hydrocarbon stock from at least one part per million of linear fluoroalkyl organo polysiloxane copolymer having from 400 to 1,000,000 centipoise viscosity at 25° C. where the copolymer has from 20 to 70 mole percent of fluoroalkyl organo siloxy units and where the organo group is a monovalent hydrocarbon radical. A critical part of the process of the present invention is to utilize a copolymer as defined above; that is, one in which the organo fluoroalkyl siloxy units in the polymer varies from 20 to 70 mole percent. If the amount of the fluoroalkyl organo siloxy units is more than 70 mole percent, then the polymer will not be sufficiently soluble in the crude hydrocarbon stocks to accomplish the defoaming of the stock. If the fluoroalkyl organo siloxy units in the copolymer is less than 20 mole percent then the polymer will be sufficiently soluble but it will not have the proper effect on the surface tension of the crude hydrocarbon stock to be an efficient defoaming agent; in a sense it will be similar to a dimethyl polysiloxane defoamer composition. Accordingly, it is highly desirable that the copolymer have from 20 to 70 mole percent of fluoroalkyl organo siloxy units in the copolymer.

DESCRIPTION OF THE PREFERRED EMBODIMENT

There is utilized as a defoaming agent in the composition in the methods of the instant case a fluorosilicone copolymer where the organo fluoroalkyl siloxy groups in the copolymer vary from 20 to 70 mole percent. If the fluorosilicone content is below 20 mole percent then even though the copolymer is soluble in the crude hydrocarbon stocks, it nevertheless does not have any effect on the surface tension of the hydrocarbon stocks so as to act efficiently as a defoaming agent. As far as crude hydrocarbon stocks generally a fluorosilicone copolymer which has less 20 mole percent of organo fluoroalkyl siloxy units in a polymer will have generally the same effect as a dimethylpolysiloxane defoaming agent. On the other hand, when the organofluoroalkyl such as methylfluoroalkyl siloxy groups in the copolymer are above 70 mole percent then the copolymer becomes too insoluble in the crude hydrocarbon stocks and accordingly does not serve a proper defoaming function; that is, while the copolymer has the proper effect on the surface tension of the crude hydrocarbon stocks so as to reduce the defoaming of the crude hydrocarbon stocks, nevertheless because of its insolubility in the medium, it cannot perform efficiently as the defoaming agent. More preferably the fluorosilicone content of the copolymer varies from 20 to 55 mole percent and even more preferably 35 to 50 mole percent.

It should be noted that generally such copolymers would have sufficient defoaming activity on crude hydrocarbon stock in generally the temperature range of 77° to 700° F. and more preferably at a temperature in the range of anywhere from 77° to 500° F. The separators in which the crude hydrocarbon stocks such as crude oil are distilled are usually operated at a temperature range from anywhere from 300° to 500° F. and more preferably anywhere from a temperature range of 300° to 450° F. More preferably the fluorosilicone polymers with the above fluorosilicone mole percent content will act as an efficient defoaming agent at a temperature in the range of anywhere from room temperature such as 77° F. to 500° F. and more preferably from 77° F. or room temperature to 450° F.

The organo group in the linear fluoroalkyl organopolysiloxane copolymer can be selected from any monovalent hydrocarbon radical such as alkyl radicals, such methyl, ethyl, propyl, cyclo alkyl radicals, such a cyclohexyl, cycloheptyl, mononuclear aryl radicals such as phenyl, methylphenyl, ethylphenyl, alkenyl radicals such as vinyl, allyl, etc.. Preferably the organo group is a methyl group. The fluoroalkyl group is again preferably 3,3,3-trifluoropropyl. Preferably the copolymer has the viscosity of anywhere from 400 to 1,000,000 centipoise at 25° C., and more preferably has a viscosity from 1,000 to 250,000 centipoise at 25° C. and more preferably has a viscosity of anywhere from 40,000 to 250,000 centipoise at 25° C.

Preferably the copolymer is strictly a linear polymer such as one of the formula,

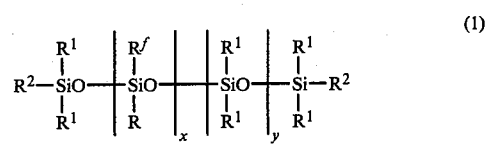

(1)

where $R^f$ is fluoroalkyl of 3 to 8 carbon atoms, R, $R^1$ are the same or different and can be any monovalent hydrocarbon radical, $R^2$ can be a monovalent hydrocarbon radical or hydroxy and x and y vary such that the mole percent of the group taken x times varies from 20 to 70 mole percent, and more preferably varies from 20 to 55 mole percent, and even more preferably varies from 35 to 55 mole percent wherein the viscosity of the polymer generally varies from 400 to 1,000,000 centipoise at 25° C. and more preferably varies from 1000 to 250,000 centipoise at 25° C. The radicals R, $R^1$ and $R^2$ are preferably selected from any monovalent hydrocarbon radical such as alkyl radicals of 1 to 8 carbon atoms, methyl, ethyl, propyl, etc., cyclo alkyl radicals such as cyclohexyl cycloheptyl etc., mononuclear aryl radicals such as phenyl, methylphenyl, ethylphenyl, etc., alkenyl radicals such as vinyl allyl etc. and other monovalent hydrocarbon radicals. Most preferably the R, $R^1$ and $R^2$ are selected from alkyl radicals 1 to 8 carbon atoms such methyl ethyl propyl, and most preferably the R, $R^1$ and $R^2$ are methyl radicals. Such a copolymer is the easiest and cheapest to make.

The molecular weight of fluorosilicone fluids will vary anywhere from 5,000 to 100,000 with a preferred range being a range of 30,000 to 65,000 molecular weight. The above molecular weight ranges are given generally and are not that critical. The viscosity ranges given above define the viscosity of the general and preferred fluids having a certain molecular weight to be utilized as defoaming agents within the scope of the instant invention. There are a number of ways of making such copolymers, however the preferred method is that disclosed in the patent application of John S. Razzano, Ser. No. 574,332 filed May 5, 1975, entitled Diorganopolysiloxane Copolymers and Process for the Preparation Thereof, which has been abandoned and for which a Continuation-In-Part, Ser. No. 585,675 filed June 6, 1975, is now pending. The process for producing the copolymer is generally comprised of producing diorganopolysiloxane polymers having the viscosity of anywhere from 50 to 100,000,000 centipoise at 25° C. comprising reacting cyclic siloxane, $$(R^3R^4\text{—SiO})_4$$

or a mixed such polysiloxane and a cyclic polysiloxane of the formula, $$(R^5\text{—SiO})_z$$

where z is from 3 to 6 or mixed such polysiloxanes, (i) being present in an amount from 20 to 70 mole percent of the mixtures of (ii) at a temperature of 0° to 90° in the presence of 5 to 300 part per million of a catalyst selected from the group consisting of CsOH, a silanolate thereof, or a compound of the formula,

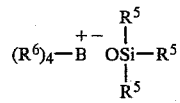

where $R^6$ is alkyl of 1 to 8 carbon atoms, cycloalkyl of 4 to 8 carbon atoms or phenyl, B is nitrogen or phosphorous, $R^5$ is alkyl of 1 to 8 carbon atoms, cycloalkyl of 4 to 8 carbon atoms, phenyl, a siloxane chain of the unit formula, $R^7SiO_{4-a}$ and mixtures thereof wherein $R^7$ is monovalent hydrocarbon, a is from 1.5 to 2.5 and neutralizing the catalyst in the reaction mixture after equilibration has been reached, and wherein $R^3$ is fluoroalkyl of 3 to 8 carbon atoms, the $R^4$ and $R^5$ radicals are selected from the class consisting of alkyl radicals of 1 to 8 carbon atoms, vinyl or phenyl.

There are other steps to this preferred process such as the further step comprising heating the reaction mixture to 150° to 200° C. and at a vacuum of 1 to 100 mm of mercury stripping off all volatiles. The cyclic tetrasiloxanes or cyclic trisiloxanes are obtained by hydrolyzing the diorganodichlorosilanes in water and then taking the hydroylzate and adding to it KOH and heating the hydrolyzate at elevated temperatures so as to preferentially distill overhead and collect cyclotetrasiloxanes or cyclic trisiloxanes, depending on the temperature the reaction mixture is heated to and depending on the amount of KOH that is utilized as the catalyst in the cracking mixture. After the equilibration reaction is over the catalyst is neutralized with an acidic agent and the remaining cyclics that have not reacted are stripped off. It should be noted that the cyclic polysiloxanes are reacted with a catalyst in an equilibration reaction from ½ to 10 hours. For more information in the production of such copolymers one is referred to the disclosure of Razzano, Ser. No. 585,675 which was filed on June 6, 1975 which is presently pending.

Generally there is utilized at least an effective amount of the defoaming agent to produce an efficient defoaming of the crude hydrocarbon stocks. Generally there may be utilized the defoaming compound at a concentration of anywhere from 1 part per million to 5 parts by weight per 100 parts by weight of the crude hydrocarbon stocks or 5 percent by weight of the crude hydrocarbon stocks. It should be noted that if there is utilized a concentration of less than effective amount or below one part per million the compound does not generally have sufficient defoaming activity on the crude hydrocarbon stocks. If there is utilized a concentration of more than 5 parts by weight per 100 parts of the crude hydrocarbon stocks, then it does not add any further defoaming activity to the composition, and in addition the cost of the defoamer becomes prohibitively high. It should be noted that such fluorosilicone copolymers as that of Formula (1) above are premium products which command a relatively high price in the industry. Accordingly, it is not desirable to use or to waste such fluorosilicone copolymers when further use of them as a defoamer will not increase or add any benefit as far as defoaming activity in the crude hydrocarbon stock composition. It should be noted that it is an additional advantage of the fluorosilicone copolymers of the instant case as defoaming agents, that they will not poison the hydroformulation catalyst in the distillation column or separator which separates the low molecular weight components from the crude oil or crude hydrocarbon stocks. Generally the catalyst is platinum or palladium and it has been found that the copolymer in the instant case will not poison such catalysts. On the other hand it has been found that fluorosilicone homopolymers which have 100 percent of fluorosilicone units in them poison such hydroformulation catalyst, specifically a platinum hydroformed catalyst. Such copolymers of Formula (1) above are added to the crude hydrocarbon stock composition at the point where the foaming occurs or just before the point in the process where the foaming occurs. It has been found when so added these compounds will retard the formation of foaming at various temperatures with great efficency. It has been found that it is desirable to meter such anti foaming agents into the crude hydrocarbon stocks or other organic compositions which are to be defoamed by use of a pump or other metering device. Accordingly in the case of high viscosity fluorosilicone fluids of Formula (1) it is desired to lower the viscosity of the fluorosilicone copolymer such that it can be easily pumped. The general range for the viscosity of fluorosilicone copolymers is from 400 to 1,000,000 centipoise and more preferably from 1,000 to 250,000 centipoise and even more preferably from 40,000 to 250,000 centipoise at 25° C. Accordingly, for the fluorosilicone copolymer of Formula (1) which has a viscosity in the neighborhood of 40,000 centipoise or above or even for a fluorosilicone copolymer which has a viscosity as low as 5,000 to 10,000 it would be desirable to dissolve it in a solvent so that it can be easily metered into the crude hydrocarbon stocks or other type of hydrocarbon stock composition which is desired to defoam. Accordingly, generally it is desirable that the fluorosilicone copolymer of Formula (1) be dissolved in a hydrocarbon solvent such that there is formed a solution of 30 to 75 percent by weight solids of the fluorosilicone copolymer of Formula (1) in a hydrocarbon solvent wherein the solution has the viscosity of anywhere from 400 to 2,000 centipoise at 25° C. since that is the most easily pumpable or metering viscosity of the additive. The hydrocarbon solvent can be any organic hydrocarbon solvent which is compatible with a system which is to be defoamed and is more preferably selected from aromatic solvents, aliphatic hydrocarbon solvents and cyclo aliphatic hydrocarbon solvents and methylethylketones. Preferably the hydrocarbon organic solvent is selected from aromatic solvents such as xylene, toluene, aliphatic hydrocarbon solvents such as cyclohexane, heptane, and octane.

In application the fluorosilicone copolymer of Formula (1) is simply dissolved in an organic solvent in the above solids concentration so as to produce a solution of a viscosity varying anywhere from 400 to 2,000 centipoise at 25° C. and then the solution is metered into the composition that is to be foamed by well known metering techniques.

The fluorosilicone copolymer of formula that has been defined in this case may be utilized in various kinds of processes and equipment to defoam the system. It is particularly preferred for crude hydrocarbon stocks systems and specifically for the defoaming of crude oil systems when they are processed in separators or distillation columns. However, they may be utilized in most other organic foam system in which defoaming is desired, if they have the two properties in such system of the proper solubility while at the same time reducing sufficiently the surface tension and interacting properly with respect to the surface tension of the system so as to reduce the foaming of the organic system. Other processes and equipment for which the fluorosilicone copolymer of Formula (1) may be utilized with advantage to defoam the system is in diethyleneglycol, or triethylene glycol used in gas dehydration units which may become contaminated and cause foaming of the units. Foaming in such systems during refrigeration can result in a high glycol loss and a reduction in handling capacity. The compounds can be utilized in delayed cokers where severe foaming in the coke drum limits production and allows coke to carry over and plug the gas recovery system. The copolymers of Formula (1) may be utilized in Udex units where foam formulation is usually encountered in the stripper using diethylene and dipropylene glycol with respect to extractor solvents thus reducing the capacity in the unit and may be utilized in tube antifoulant systems where coke builds up on furnace tubes and limits length of runs and capacity of the units and may be utilized in high detergent motor oils and may be utilized in the processing of asphalt where low loading, mixing and spraying of asphalt are impeded by foaming. The compounds may be utilized in hot residuum storage where foaming limits the capacity of a tank and may cause froth overs outside of the storage tanks.

Accordingly, the fluorosilicone copolymer of Formula (1) may be utilized with the advantage in any highly organic system in which the hydrocarbon stocks such as crude oil create foam and in which it is desired to eliminate the foam so as to increase the efficiency of processing the crude stocks. Accordingly it is not meant to limit the process of the instant case for utilizing the fluorosilicone copolymer solely for the defoaming of crude hydrocarbon stock such as crude oil but the invention can be utilized to defoam crude hydrocarbon stocks other than the crude oil which is high in the hydrocarbon content and which is a result of them being processed in a particular process that results in a lot of foam being formed in the processing operation. It is noted in such cases that it is desirable to decrease the foam or eliminate the foam so as to increase the efficiency and yield of the processing operation.

All the examples below are given for the purpose of illustrating the invention. They are not given for any purpose of setting limits and boundaries to the instant invention. All parts in the examples are in parts per million.

EXAMPLE 1

The following antifoam compositions were tested in crude oil as defoaming agents at concentrations shown below. The efficiency of the antifoam agent, which is identified in this example as antifoam in crude oil at the parts concentration as shown in Table 1 below, is also set forth in Table 1 below. Referring to Table 1 below:

Compound X is a 30 weight percent antifoam emulsion. The fluid is polydimethyl siloxane which is trimethyl siloxy end-stopped. The emulsifier is Sorbitan stearate and polyethyleneglycolstearate, and the emulsion is in water.

2X is 100 centistoke at 250° dimethylpolysiloxane oil which is a trimethylsiloxy end-stopped and contains 4 to 5 weight percent silica filler.

3X is a 10 percent by weight emulsion of dimethyl polysiloxane fluid of a 350 centipoise viscosity with 5 weight percent silica filler.

4X is a blend of a 350 centistokes viscosity at 25° C. of an dimethylpolysiloxane oil with an 1000 centistoke viscosity at 25° C. dimethylpolsiloxane oil the blend having 500 centistoke viscosity at 25° C. The oils are both trimethylsiloxy end-stopped and the blend contains 7.5 weight percent silica filler.

5X is a 30 weight percent emulsion of 4X which emulsifying is Sorbitan stearate and polyethyleneglycol stearate.

6X is a 50 weight percent silanol terminated dimethyl polysiloxane fluid having a viscosity of 1,000 centipoise at 25° C. dissolved in odorless mineral spirits.

7X is a 25 weight percent dimethylpolysiloxane gum which has a viscosity of 5,000 centipoise at 25° C. which dissolved in odorless mineral spirits.

8X is a 50 percent by weight of a dimethylpolysiloxane fluid having a viscosity of 8,000 to 25,000 centipoise at 25° C. having trimethylsiloxy end-stopped groups blended with 35 percent by weight of a resin having trimethylsiloxy monofunctional units and $SiO_2$ tetrafunctional units in which the ratio of the monofunctional to the tetrafunctional units is 0.8 to 1.

9X is a 25 weight percent solution of silanol terminated dimethylpolysiloxane dissolved in mineral agents.

10X is a 350 centistokes viscosity at 25° C. of dimethylpolysiloxane fluid having trimethylsiloxy end-stopping units.

11X is a 1,000 centistokes viscosity at 25° C. and a dimethylpolysiloxane fluid having trimethylsiloxy end-stopping units.

12X is a fluorosilicone fluid having 100 mole percent of methyl 3,3,3-trifluoropropyl siloxy groups with trimethyl end-stopped and has a viscosity of 1,000 centistokes viscosity at 25° C.

13X is a 50 weight percent copolymer having 50 weight percent of methyl 3,3,3-trifluoropropyl siloxy group in the copolymer and having the viscosity of 600 centipoise viscosity at 25° C. of copolymer being trimethylsiloxy end-stopped.

14X is a fluorosilicone copolymer having 50 mole percent of methyl 3,3,3-trifluoropropyl siloxy groups and the copolymer having the viscosity of 55,000 at 25° C. and being silanol end-stopped and the copolymer being dissolved in toluene. The copolymer is present at 70 percent by weight solids solution in toluene wherein the solution has the viscosity of 1,000 centipoise viscosity at 25° C.

15X is a dimethylpolysiloxane fluid which is trimethylsiloxy end-stopped which has a viscosity of 12,500 centipoise viscosity at 25° C.

16X is a methylpolysiloxane fluid having trimethylsiloxy end-stopped units and having the viscosity of 60,000 centipoise viscosity at 25° C.

17X is a trimethylsiloxy end-stopped dimethyl polysiloxane fluid of a viscosity of 1,000 centipoise viscosity at 25° C.

The behavior of the above fluids in anti-foam ingredients in crude at the concentrations listed are given in Table 1 below.

TABLE 1

| Antifoam Compound | 70° F. | 310° F. |
|---|---|---|
| X | G | P |
| 2X | E | P |
| 3X | G | P |
| 4X | E | NC |
| 5X | F | P |
| 6X | VG | E |
| 7X | F | E |
| 8X | F | P |
| 9X | VG | E |
| 10X | G | P |
| 11G | G | F |
| 12X | F | E |
| 13X | F | E |
| 14X | E | E |
| 15X | G | E |
| 16X | F | E |
| 17X | E | NC |

Ratings:
E Excellent - foam eliminated
VG Very good - nearly all foam gone (5-15% of original foam level)
G Good - moderate foam remaining (15-45% of original foam level)
F Fair - some improvement (45-90% of original foam level)
NC No Change - (original foam level + 10%)
P Poor - increased foaming (usually 50-100% increase)
Test Concentration: 500 ppm As the results in Table 1 above indicate the fluorosilicone copolymers of the instant case are superior defoaming agents for crude hydrocarbon stocks over a wide temperature range as compared to other prior art defoaming compositions and processes in the defoaming of crude hydrocarbon stocks.

I claim:

1. A method for defoaming crude hydrocarbon stock composition, adding at least 1 part per million of a linear fluoro alkyl organo polysiloxane copolymer having a viscosity from 400 to 1,000,000 centipoise at 25° C. where the copolymer has from 20 to 70 mole percent of fluoroalkyl, organo siloxy units and where the organo group is a monovalent hydrocarbon radical.

2. The method of claim 1 wherein the concentration of the copolymer is from 1 part per million to 5 parts by weight per 100 parts by weight of the crude hydrocarbon stocks.

3. The method of claim 2 wherein the concentration of the copolymer from 1 to 30 parts per million.

4. The method of claim 1 wherein the crude hydrocarbon stock is crude oil.

5. The method of claim 1 wherein the viscosity of the copolymer is from 1,000 to 250,000 centipoise at 25° C.

6. The method of claim 1 wherein the fluoroalkyl group in the copolymer is trifluoropropyl.

7. The method of claim 1 wherein the copolymer has the formula,

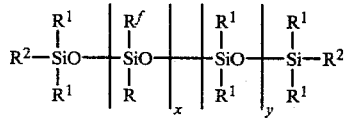

where R^f is fluoroalkyl of 3 to 8 carbon atoms, R, $R^1$ are the same or different and can be any monovalent hydrocarbon radical, $R^2$ can be a monovalent hydrocarbon radical or hydroxy and x and y vary such that the mole percent of the fluoroalkyl, organo siloxy units taken x time varies from 20 to 70 mole percent and the viscosity of the total polymer varies from 400 to 1,000,000 centipoise at 25° C.

8. The method of claim 7 where $R^f$ is 3,3,3-trifluoropropyl and R, $R^1$ and $R^2$ are methyl.

9. The method of claim 1 wherein the defoaming is carried out at temperatures in the range of room temperature to 500° F.

10. A defoamed hydrocarbon stock composition comprising 100 parts by weight of a hydrocarbon stock and at least 1 part per million of a linear fluoroalkyl organopolysiloxane copolymer having viscosity from 400 to 1,000,000 centipoise at 25° C. where the copolymer has from 20 to 70 mole percent of fluoroalkyl, organosiloxy units and where the organo group is a monovalent hydrocarbon radical.

11. The composition of claim 10 wherein the concentration of the copolymer is from 1 part per million to 5 parts by weight per 100 parts by weight of the crude hydrocarbon stocks.

12. The composition of claim 11 wherein the concentration of the copolymer is from 1 to 30 parts per million.

13. The composition of claim 10 wherein the crude hydrocarbon stock is crude oil.

14. The composition of claim 10 wherein the viscosity of the copolymer is from 1,000 to 250,000 centipoise at 25° C.

15. The composition of claim 10 wherein the fluoroalkyl group in the copolymer is trifluoropropyl.

16. The composition of claim 10 wherein the copolymer has the formula,

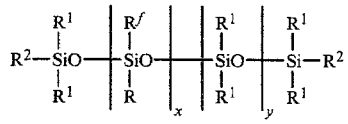

where $R^f$ is fluoroalkyl of 3 to 8 carbon atoms, R, $R^1$ are the same or different and can be any monovalent hydrocarbon radical, $R^2$ can be a monovalent hydrocarbon radical or hydroxy and x and y vary such that the mole percent of the fluoroalkyl, organo siloxy units taken x times varies from 20 to 70 mole percent and the viscosity of the total polymer varies from 400 to 1,000,000 centipoise at 25° C.

17. The composition of claim 16 where $R^f$ is 3,3,3-trifluoropropyl and R, $R^1$ and $R^2$ are methyl.

18. The method of claim 1 wherein the defoaming is carried out under vacuum.

19. The method of claim 1 wherein the copolymer is utilized as a 30 to 75 percent by weight solid of the copolymer in an organic hydrocarbon solvent where the resulting solution has a viscosity in the range of 400 to 2000 centipoise at 25° C.

20. The method of claim 19 wherein the organic hydrocarbon solvent is selected from the class consisting of xylene, toluene, cyclohexane, cycloheptane, and ketone containing hydrocarbon solvents.

21. The composition of claim 10 wherein the linear fluoroalkyl organo polysiloxane copolymer is added to the crude hydrocarbon stock in the form of a 30 to 75 percent by weight solid solution in an organic hydrocarbon solvent.

22. The composition of claim 21 where the organic hydrocarbon solvent is selected from the class consisting of the xylene, toluene, cyclohexane, cycloheptane, octane, and ketone containing hydrocarbon solvents.

* * * * *